Jan. 18, 1966          L. COMORAU          3,229,374

THREAD GAUGES

Filed Aug. 20, 1963          2 Sheets-Sheet 1

INVENTOR.
LEO COMORAU
BY *Albert F. Kronman*
ATTORNEY

Jan. 18, 1966   L. COMORAU   3,229,374
THREAD GAUGES

Filed Aug. 20, 1963   2 Sheets-Sheet 2

INVENTOR.
LEO COMORAU
BY Albert F. Kronman
ATTORNEY

United States Patent Office 3,229,374
Patented Jan. 18, 1966

3,229,374
THREAD GAUGES
Leo Comorau, 36—27 32nd St., Long Island City, N.Y.
Filed Aug. 20, 1963, Ser. No. 303,238
7 Claims. (Cl. 33—199)

This invention relates to a thread gauge and more particularly relates to an external thread gauge for the inspection of external threads.

Prior conventional external thread gauges have been made in the form of a body or block having a passage with an accurate internal thread in the wall thereof. When a member such as a bolt or the like with a thread thereon of an appropriate diameter and pitch is applied to the gauge it can be determined whether or not such external thread is accurate enough for the purpose at hand. Two ring gauging members are generally used, a "Go" member and a "Not Go" member. Thus if the externally threaded member will not enter the "Go" gauge, it can be seen that the threaded member is oversized and unsatisfactory. It is also unsatisfactory if externally threaded member enters the "Not Go" gauge. Thus it may be seen that an externally threaded part is satisfactory only if it enters the "Go" member but does not enter the "Not Go" member.

Such prior thread gauges have been expensive to make with a requisite degree of accuracy. They are subject to appreciable wear in use, during which a number of externally threaded members are screwed into and removed from the gauge for test purposes. When such prior known gauges have become appreciably worn, they must be discarded or refinished to attempt to bring them back to their original accuracy and effectiveness. Either practice entails a substantial cost and constitutes a substantial item of expense in the maintenance of a tool room.

In accordance with the present invention there is provided a novel thread gauge for external threads, the gauge incorporating an easily replaceable, economical thread-providing element. When such element becomes worn unduly it may readily be removed and replaced by a new one at a cost which is a relatively small fraction of that which would be involved in replacing the entire gauge. In certain of the illustrative embodiments of the thread gauge in accordance with the present invention provision is made for the adjustment of the inner and pitch diameters of the thread on the thread gauge whereby to compensate for wear of the gauge and/or bring such measurements to the desired degree of accuracy after the parts of the gauge have been assembled.

The invention has among its objects the provision of a novel thread gauge for external threads.

A further object of the invention resides in the provision of a thread gauge having a removable and replaceable gauging thread-providing element therein.

Another object of the invention, in certain of the disclosed embodiments thereof, lies in the provision of a thread gauge of the type indicated wherein the pitch and internal diameters of the gauging thread may be adjusted within limits.

Still another object of the invention lies in the provision of a novel assembling tool for inserting the thread-providing element of the gauge into the main body of the gauge and for removing it therefrom.

The above and further objects and novel features of the invention will more fully appear from the following description when the same is read in connection with the drawings. It is to be expressly understood, however, that the drawings are for the purpose of illustration only and are not intended as a definition of the limits of the invention.

In the drawings, wherein like reference characters refer to like parts throughout the several views, FIG. 1 is a view in vertical axial section through the main body of a first embodiment of thread gauge in accordance with the invention, a tool for assembling the removable thread-forming element of the gauge in the main body thereof being shown aligned with such main body preparatory to the assembly of such element in the body, such tool being shown partially in vertical axial section and partially in elevation;

Figure 12:
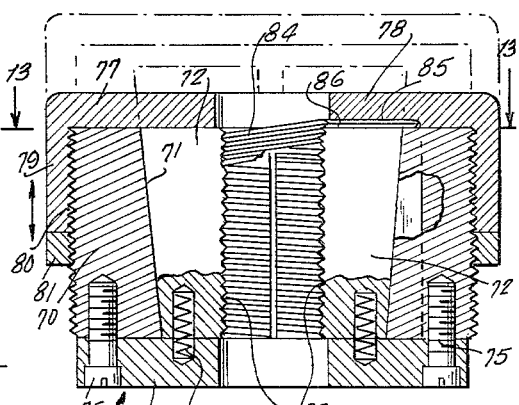
Figure 13:
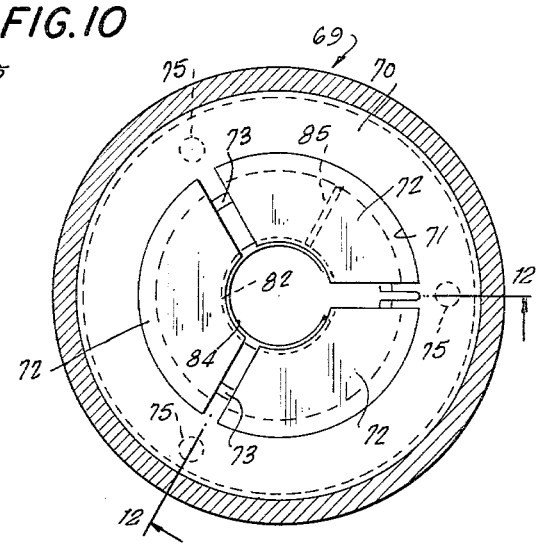

FIG. 12 is a view in vertical axial section through a third illustrative embodiment of thread gauge in accordance with the invention, the thread-forming insert being partially broken away for clarity of illustration, the section being taken along the broken section line 12—12 in the direction of the arrows in FIG. 13, certain of the parts being shown in elevation; and FIG. 13 is a view in transverse section through the third embodiment of gauge, the section being taken along the line 13—13 in the direction of the arrows in FIG. 12.

Figure 9:
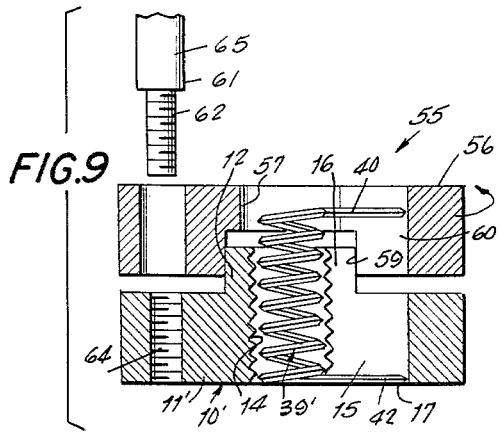
FIG. 9 is an exploded view in vertical axial section through a second illustrative embodiment of thread gauge in accordance with the invention, certain of the parts being shown in elevation.
Figure 10:
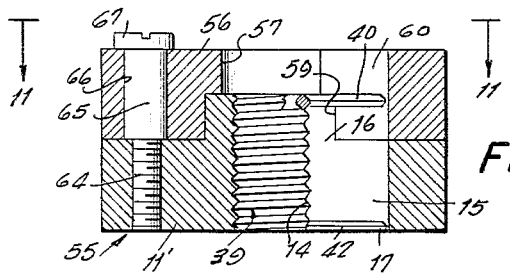
FIG. 10 is a view in vertical axial section through the second disclosed embodiment of thread gauge, certain of the parts being shown in elevation.
Figure 11:
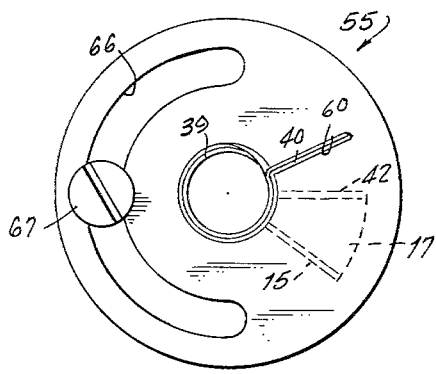
FIG. 11 is a view in top plan of the second illustrative embodiment of gauge, the view being taken from the line 11—11 in the direction of the arrows in FIG. 10.

As is apparent from the above, three embodiments of thread gauge are shown herein by way of illustration. The first embodiment of thread gauge, and of the assembling and disassembling tool employed therewith, are shown in FIGS. 1 to 8, inclusive. The second embodiment of thread gauge is shown in FIGS. 9, 10 and 11. The third embodiment of thread gauge is shown in FIGS. 12 and 13.

Turning now to FIGS. 1 to 8, inclusive, the thread gauge therein, which is generally designated by the reference character 10, has a main body 11 generally in the form of a disk from which there projects a hollow central boss 12. Body 11 may be made of a metal such as steel. A central passage 13 extends through body 11 and boss 12, the side wall of such passage being threaded as indicated at 14. Body 11 is provided with a narrow radially directed slot 15 therethrough, such slot being continued through the aligned portion of the boss 12 as indicated at 16. At the bottom of body 11 there is provided a shallow sector shaped pocket 17 which extends from the lower end of slot 15 to receive the lower tang 42 of the removable thread-providing insert of the thread gauge, in a manner to be explained.

Figure 1:
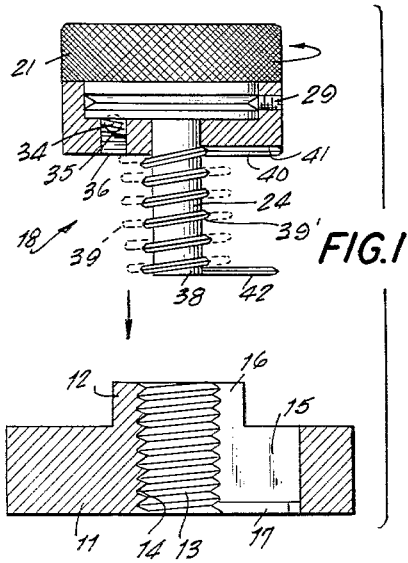
Figure 5:
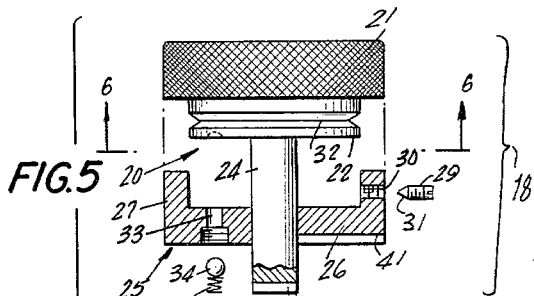
FIG. 5 is an exploded view partially in vertical axial section and partially in elevation of the assembling tool employed in accordance with the first disclosed embodiment of gauge.
Figure 6:
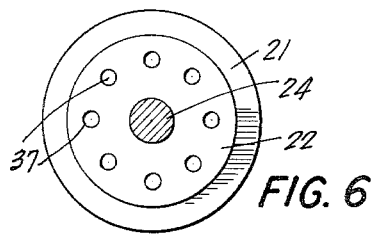
FIG. 6 is a view in transverse section through such assembling tool, the section being taken along the line 6—6 in the direction of the arrows in FIG. 5.
Figure 2:
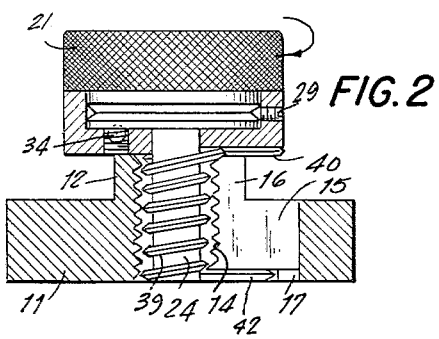
FIG. 2 is a view in vertical axial section through the main body of the first embodiment of thread gauge with the assembling tool applied thereto, the thread-providing element being shown in a preliminarily assembled condition, certain of the parts being shown in elevation.
Figure 7:
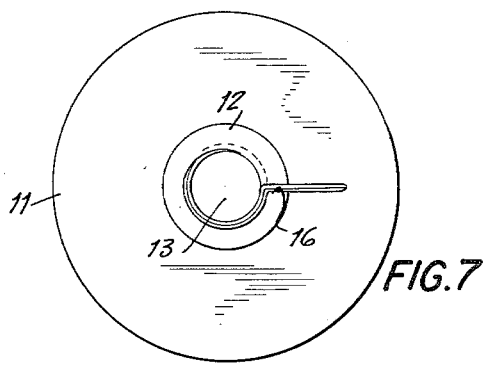
FIG. 7 is a view in top plan of the first embodiment of gauge, the view being taken from the line 7—7 in the direction of the arrows in FIG. 3.
Figure 3:
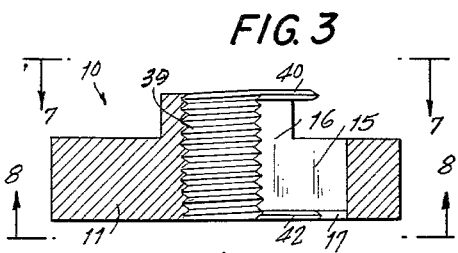
FIG. 3 is a view in vertical axial section through the main body of the first embodiment of thread gauge with the thread-providing element fully assembled therein, the thread-providing element being shown in side elevation.
Figure 8:
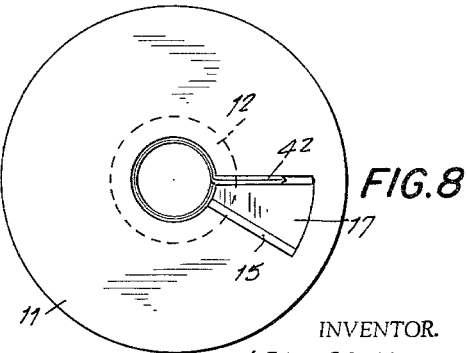
FIG. 8 is a view in bottom plan of the first embodiment of gauge, the view being taken from the line 8—8 in the direction of the arrows in FIG. 3.

An insert assembling tool, generally designated 18, which may be employed in connection with the first embodiment of thread gauge, has a construction most clearly shown in FIGS. 5 and 6. Such tool has a first or upper part generally designated 20 having a disk-like manipulating knob 21 on the upper end thereof. Connected coaxially to the lower end of knob 21, as by being integral therewith, is a second smaller diametered disk 22. Depending from disk 22 centrally thereof is a circular cylindrical stub shaft 24. Shaft 24 extends through and is journalled in a second lower element 25 of the tool. Element 25 is generally of shallow cup shape, having a flat disk-like bottom 26 in which the shaft 24 is centrally journalled and an upstanding rim portion 27. Portions 20 and 25 of the tool are assembled in the manner shown in FIGS. 1 and 2, and are held in that condition by means of a set screw 29 which is threaded into a passage 30 in the rim 27. Screw 29 has a conical inner end 31 which may be advanced into a V-shaped peripherally extending groove 32 in element 22 to hold parts 20 and 25 of the tool together.

The part 20 of the tool is selectively retained from rotation about its axis with respect to part 25 by a ball detent 34 which fits within a passage 33 in bottom 26 of the lower part of the tool and is urged upwardly into contact with the lower surface of element 22 by a coil compression spring 35 acting between the ball detent and an abutment plug 36 screwed into the outer end of passage 33. As shown most clearly in FIG. 6, the lower surface of element 22 is provided with a plurality of angularly spaced part-spherical depressions 37 which receive the ball detent 34 as the latter is rotated therepast. Engagement between the ball detent and depressions 37 is forceful enough to prevent the fortuitous turning of member 20 relative to member 25 by the unwinding torque presented by a helically coiled insert 39 as it is being inserted in the body 11 in the manner generally shown in FIG. 1.

The thread-providing insert 39, which has upper and lower radially directed tangs 40 and 42, respectively, is mounted on the tool 19 so that the upper tang 40 is stably received within a radially directed slot 41 on the bottom of part 26 of the tool. The lower tang 42 of the insert is mounted in a diametrically disposed slot 38 on the bottom of the stub shaft 24 of the tool. Such mounting of the insert takes place when the insert is in its expanded or relaxed condition, as shown in phantom lines in FIG. 1. Thereupon the upper portion 20 of the tool is rotated in the direction of the curved arrows in FIG. 1 with respect to the bottom portion of the tool, thereby to wind the insert 39 tightly upon the stub shaft 24 into the condition indicated at 39'.

In such fully wound condition of the insert, its effective outer diameter is somewhat less than the effective inner diameter of the thread 14 in passage 13 of body 11. The tool 19 with the wound-up insert 39' thereon is then advanced toward body 11 to cause the stub shaft 24 and the insert thereon to enter the passage 13. During such assembly step, the lower tang 42 will have entered and passed through slot 16 and passed downwardly through slot 15 in body 11 until it lies in the shallow pocket 17 on the bottom surface of body 11. The upper tang 40 of the insert will lie in the upper end of slot 16 in boss 12 and will be held from escape therefrom by the lower surface of bottom part 26 of the tool, which then abuts the upper surface of boss 12. The turning of the knob 21 of the tool in the direction of the curved arrows in FIG. 2 will permit the insert 39 to expand into firm compressive contact with the threads 14, the insert thus being freed on the stub shaft 24. When the tool 18 is then withdrawn from body 11 the insert will remain in the latter, forming a part of the fully assembled thread gauge shown in FIG. 3.

Figure 4:
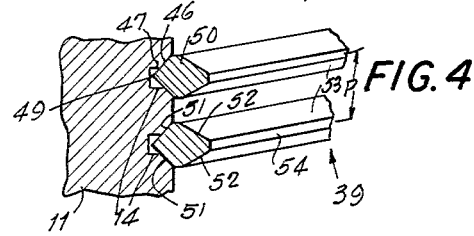
FIG. 4 is an enlarged fragmentary view in vertical radial section through the main body of the first embodiment of gauge at one side of the threaded passage therein.

In the embodiment shown, as more clearly illustrated in FIG. 4, the thread 14 is a modification of the so-called Acme type, having oppositely inclined main side walls 46, spaced shallow parallel inner side walls 47, and a flat root surface 49 parallel to the axis of passage 13. The insert 39 is formed of wire stock 50, made for example of a metal such as stainless steel, of generally diamond-shaped cross section, the rear or outer surfaces 51 of each turn of said stock lying at substantially the same angle as the surfaces 46 of the thread 14 and compressively interfitting therewith, as shown. When the passage 13 has an accurate predetermined diameter and the thread 14 in the wall thereof has an accurate pitch and radial depth, the thread engaging surfaces of the insert 39 will be located with the same degree of accuracy, assuming that the wire 50 is made within the same tolerances of accuracy. Thus the narrow flat inner surface 54 of each turn 50 of the insert will lie at a predetermined distance from the axis of passage 13, and the confronting surface elements or lines 53 on the surfaces of successive turns 50 of the insert at the pitch diameter thereof will lie at an accurate predetermined distance from each other, and the pitch P of the gauging thread presented by insert 39 will be constant. Thus the gauge 10 serves accurately to measure both the root diameter of the thread on an externally threaded member, and the pitch of such thread.

When it is desired to remove the insert 39 from the body 11, the tool 18 may again be used. The tool is fully inserted into the gauge 10 in the manner shown in FIG. 2, and the upper tang 40 of the insert is raised from the upper end of slot 16 in boss 12 to lie in the radial slot 41 in the bottom of part 26 of the tool. The knob 21 may now be turned to cause the lower tang 42 of the insert 39 to enter groove or slot 38 in stub shaft 24. Following this, the knob 21 is turned relative to the lower part 25 of the tool, whereby to wind the insert 39 on the stub shaft and to withdraw it from the threads 14 in passage 13 of body 11. When the insert has been wound into the condition shown in FIG. 2, the tool and the insert may be removed from body 11 of the gauge.

The second illustrative embodiment of thread gauge is shown in FIGS. 9, 10 and 11, where it is generally designated by the reference character 55. Gauge 55 differs from the above described gauge 10 by its incorporation of a somewhat more positive means for retaining the upper tang of the insert 39 in position on body 11' of such gauge 55 and by its provision of means whereby the upper and lower tangs of the insert may be angularly adjusted within limits with respect to each other whereby to adjust the inner root diameter and the pitch diameter of the insert.

Gauge 55 employs as a first or lower body part 11' one which is generally the same as the body 11 of the first described gauge. Parts of the body 11' which are the same as those of body 11 are designated by the same reference characters. The thread-forming insert 39 and its tangs 40 and 42 are the same as in the first described embodiment of gauge. The body of gauge 55 is completed by an upper body part 56 which has a bore 57 centrally thereof and a counterbore 59 in its lower portion, the counterbore accurately receiving the boss 12 of the body 11'. In this embodiment of gauge the body part 56 functions as an insert assembling tool as well as a means for retaining the upper tang of the insert in position on the body of the gauge.

In assembling the insert 39 of the body 11' the lower end of the insert is first preliminarily engaged with the upper end of boss 12 and with the lower tank 42 on the insert is disposed in the upper end of slot 16 in boss 12. Thereupon the body 56 is applied to the upper end of the insert with the upper tang 40 of the latter disposed in a radial slot 60 in body 56. Turning of the body 56 in the direction of the curved arrows in FIG. 9 relative to body 11' will result in the winding up of the insert progressively until it reaches the condition designated 39' in FIG. 9, in which the turns of the insert clear the peaks of the thread 14 in body 11' and permit the insert to be slid downwardly in the passage 13 until the lower tang 42 snaps into pocket 17 in the lower surface of body 11' and the upper end of boss 12 enters the counterbore 59. When the bodies 11' and 56 have been fully engaged, as shown in FIG. 10, such bodies 11' and 56 are allowed to turn in the reverse direction with respect to each other so that the insert expands into the condition shown in FIG. 10, wherein each turn of the insert is compressively and accurately engaged within its respective valley of the thread 14. The bodies 11' and 56 are retained in assembled condition by means of a machine screw 61 having a lower threaded end 62 of reduced diameter, an upper circular cylindrical shank 65, and a head 67. The end of the screw 62 is threadedly received within a bore 64 in body 11', the upper portion 65 of the screw being slidably received within a part-circular slot 66 coaxial of bore 57 in body 56. The described construction permits the bodies 11' and 56, and thus the tangs 42 and 40 held by such respective bodies, to be adjusted angularly with respect to each other throughout the range permitted by the angular extent of slot 66. This permits the inner root diameter and the pitch diameter of insert 39 to be varied somewhat as desired, as to arrive at the desired initial values thereof and to compensate for wear in the thread gauge.

The third illustrative embodiment of thread gauge in accordance with the invention is shown in FIGS. 12 and 13, where it is designated generally by the reference character 69. Such gauge has an annular body 70 with a frusto-conical central passage 71 therein. Seated in passage 71 are three similar jaw-like members 72 having outer frusto-conical outer surfaces complementary to surface 71. Members 72 present a generally circular cylindrical threaded passage therebetween, as shown. Members 72 are constantly urged away from each other by coil compression springs 73 disposed between the spaced end surfaces of successive pairs of such members. Gauge 69 has a lower transverse annular plate 74 which is retained on body 70 by headed screws 75 spaced angularly about the plate and screwed into body 70. The jaw-like members 72 are constantly urged upwardly with respect to the body 70 and plate 74 by coil compression springs 76 the opposite ends of which are received in aligned seats in plate 74 and the respective members 72. The thread gauge has an inverted cup-like cap 77 having an annular central end member 78 and a depending skirt 79. The skirt 79 of the cap 77 has threaded engagement with the outer surface of body 70, as indicated at 80. The effective diameter of the central passage presented between the confronting members 72 may be varied by varying the extent to which the cap 77 is screwed down upon the body 70. The cap 77 may be retained in adjusted position by means of a lock nut 81 on the body 70, such nut engaging the lower edge of skirt 79.

The thread providing insert 84 employed in gauge 69 is generally similar to the insert 39, described above in connection with the two previous embodiments, has the same coaction with the thread portions 82 on the inner surface of each of members 72. Insert 84, however, is in this instance provided with a single upper tang 85 which is retained in a shallow radial groove 86 on the lower surface of central portion 78 of the cap 77. The effective inner and pitch diameters of insert 84 may be varied appreciably by adjusting the position of cap 77 axially of body 70. This not only varies the effective diameter of the threaded passage presented by thread portions 82 on members 72, but also by reason of the turning of tang 85 with the cap 77 permits the insert 84 to be expanded or contracted in order to permit its effective diameter to be varied within appreciable limits while retaining its accurate compressive seating within the valleys of the threads presented by thread portions 82, on the jaw-like members 72.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention will now be apparent to those skilled in the art.

What is claimed is:

1. An external thread gauge comprising a body having a passage with a threaded wall therein, an insert in the form of a helical spring wire with the radially outer portions of the turns thereof compressively seated in the threads in the wall of the passage and the radially inner portions of the turns projecting into the passage to form the gauging threads of the gauge, and means to retain the insert in the body comprising a tang on at least one end of the insert, means to adjust the pitch diameter of insert, said last named means comprising a tang on each end of the insert, and separate means on the body for receiving the respective tangs on the insert, said separate means being adjustable with respect to each other about the axis of the insert, means to retain the tang receiving means in adjusted position with respect to each other and means on the body receiving and retaining the tang from rotation about the axis of the insert with respect to the body.

2. A thread gauge as claimed in claim 1, wherein the body of the gauge comprises two parts adjustable angularly relatively to each other about the axis of the passage through the body, each of said body parts carrying a means for receiving and retaining a tang on the insert, and means for holding the two body parts in adjusted position relative to each other.

3. A thread gauge as claimed in claim 2, comprising interchanging bearing means on the two parts of the body of the gauge to hold them centered with respect to each other while permitting their relative turning, and wherein each of the means receiving and retaining a tang on the insert comprises a generally radially directed slot in the respective body part.

4. A thread gauge as claimed in claim 2, wherein the means for holding the two body parts in adjusted position relative to each other comprises a part circular slot in one of the body parts coaxial of the passage in the body, and a headed screw passing through the slot and threaded into the other body part.

5. An external thread gauge comprising an annular body having a frusto-conical seat therein, a plurality of angularly spaced jaw-like members having external surfaces complementary to the seat in the body mounted in the seat, the radially inner surfaces of the jaw-like members presenting a threaded central circular passage therebetween, means for adjusting the jaw-like members axially with respect to the seat in the body to vary the diameter of the central threaded passage between the jaw-like members, a gauging thread-forming insert in the form of a helical wire compressively received within the threads on the radially inner surfaces of the jaw-like members, and means for retaining the insert between the jaw-like members.

6. A thread gauge as claimed in claim 5, wherein the means for retaining the insert comprises a tang on the insert, and means for turning the tang about the axis of the insert simultaneously with the adjustment of the jaw-like members in the seat.

7. An external thread gauge comprising an annular body having a frusto-conical seat therein, a plurality of angularly spaced jaw-like members having external surfaces complementary to the seat in the body mounted in the seat, the radially inner surfaces of the jaw-like members being threaded to present a threaded central circular passage therebetween, means constantly urging the jaw-like members apart and into engagement with the seat, means constantly thrusting the jaw-like members axially of the seat toward the larger diameter end thereof, means for adjustably thrusting the jaw-like members in the reverse direction whereby to vary the diameter of the central passage between the jaw-like members, a gauging thread-forming insert in the form of a helical wire compressively received within the threads on the radially inner surfaces of the jaw-like members, and means for retaining the insert in the said central passage between the jaw-like members.

References Cited by the Examiner

UNITED STATES PATENTS

| | | | |
|---|---|---|---|
| 1,875,726 | 9/1932 | Hartness | 33—199 |
| 2,099,450 | 11/1937 | Meyer | 85—32 |
| 2,497,081 | 2/1950 | Hattan | 85—32 X |
| 2,513,792 | 7/1950 | Forster | 29—240.5 |
| 2,555,964 | 6/1951 | Gabbey | 33—199 |
| 2,584,118 | 2/1952 | Forster | 29—240.5 |
| 2,594,900 | 4/1952 | Forster | 29—240.5 |

FOREIGN PATENTS 619,080   3/1949   Great Britain.

ISAAC LISANN, *Primary Examiner.*

J. D. BOOS, *Assistant Examiner.*